US012758935B2

(12) United States Patent
Ardo et al.

(10) Patent No.: US 12,758,935 B2
(45) Date of Patent: Oct. 13, 2026

(54) PHOTOCATALYST SUSPENSION REACTOR FOR SOLAR FUEL FORMATION

(71) Applicants: THE REGENTS OF THE UNIVERSITY OF CALIFORNIA, Oakland, CA (US); The Trustees of Columbia University in the City of New York, New York, NY (US); The Regents of the University of Michigan, Ann Arbor, MI (US); Strategic Analysis, Inc., Arlington, VA (US)

(72) Inventors: Shane Ardo, Irvine, CA (US); Daniel V. Esposito, New York, NY (US); Rohini Bala Chandran, Ann Arbor, MI (US); Zijie Chen, Ann Arbor, MI (US); Joseph Michael Mayer, Ann Arbor, MI (US); Luisa Barrera, Ann Arbor, MI (US); Zejie Chen, Irvine, CA (US); Brian D. James, Arlington, VA (US); Yaset Acevedo, Charlottesville, VA (US); Jennie Huya-Kouadio, Arlington, VA (US)

(73) Assignees: THE REGENTS OF THE UNIVERSITY OF CALIFORNIA, Oakland, CA (US); THE TRUSTEES OF COLUMBIA UNIVERSITY IN THE CITY OF NEW YORK, New York, NY (US); THE REGENTS OF THE UNIVERSITY OF MICHIGAN, Ann Arbor, MI (US); STRATEGIC ANALYSIS, INC., Arlington, VA (US)

( * ) Notice: Subject to any disclaimer, the term of this patent is extended or adjusted under 35 U.S.C. 154(b) by 781 days.

(21) Appl. No.: 18/330,275

(22) Filed: Jun. 6, 2023

(65) Prior Publication Data

US 2023/0390724 A1 Dec. 7, 2023

Related U.S. Application Data

(60) Provisional application No. 63/349,442, filed on Jun. 6, 2022.

(51) Int. Cl.
*B01J 8/08* (2006.01)
*B01J 35/39* (2024.01)
(Continued)

(52) U.S. Cl.
CPC ............... *B01J 8/085* (2013.01); *B01J 35/39* (2024.01); *B01J 35/45* (2024.01); *C01B 3/042* (2013.01);
(Continued)

(58) Field of Classification Search
CPC ... B01J 8/085; B01J 35/45; B01J 35/39; B01J 19/127; B01J 23/42; B01J 31/003;
(Continued)

(56) References Cited

U.S. PATENT DOCUMENTS 3,784,457 A 1/1974 Mizutani et al.
4,766,161 A 8/1988 Chlanda et al.
(Continued)

FOREIGN PATENT DOCUMENTS

JP H07241443 A 9/1995
JP 2009234934 A 10/2009
(Continued)

OTHER PUBLICATIONS

Machine translation of JP2013144616 (Year: 2013).*
(Continued)

*Primary Examiner* — Xiuyu Tai
(74) *Attorney, Agent, or Firm* — NGUYEN TARBET IP LAW

(57) ABSTRACT

A photocatalyst suspension reactor for solar fuel formation. The reactor may comprise a shallow pool filled with a first portion of an electrolyte solution. The electrolyte solution may comprise a solvent, a plurality of redox shuttle molecules, and a plurality of photocatalyst particles. The reactor may further comprise a plurality of tubes disposed on a surface of the shallow pool, each tube of the plurality of tubes comprising an upper half and a lower half. The upper half may comprise a transparent material configured to be minimally permeable to hydrogen gas and oxygen gas. The lower half may be configured to be filled with a second portion of the electrolyte solution and comprises an ion bridge material permeable to the plurality of redox shuttle molecules and minimally permeable to the plurality of photocatalyst particles.

20 Claims, 5 Drawing Sheets

(51) Int. Cl.
*B01J 35/45* (2024.01)
*C01B 3/042* (2026.01)
*C01B 3/501* (2026.01)

(52) U.S. Cl.
CPC ........ *C01B 3/501* (2013.01); *C01B 2203/041* (2013.01); *C01B 2203/0465* (2013.01)

(58) Field of Classification Search
CPC .... B01J 14/005; B01J 35/395; B01J 2235/30; C01B 3/042; C01B 3/501; C01B 2203/041; C01B 2203/0465; C01B 13/0207; C25B 11/02; C25B 1/04; C25B 1/55; C25B 9/00; C25B 9/17; C25B 11/00; C25B 11/044; C25B 9/23; C25B 9/19; C25B 1/02; Y02E 60/36; C01G 49/00; Y02P 20/133
See application file for complete search history.

(56) References Cited

U.S. PATENT DOCUMENTS

| | | | |
|---|---|---|---|
| 6,274,806 | B1 | 8/2001 | Sugihara et al. |
| 6,878,287 | B1 | 4/2005 | Marais |
| 8,764,957 | B2 | 7/2014 | Sui et al. |
| 2005/0178427 | A1 | 8/2005 | Kelly et al. |
| 2007/0099055 | A1 | 5/2007 | Lee et al. |
| 2008/0213641 | A1 | 9/2008 | Ostermann et al. |
| 2010/0133110 | A1 | 6/2010 | Nocera et al. |
| 2010/0143811 | A1 | 6/2010 | Brimblecombe et al. |
| 2011/0048962 | A1 | 3/2011 | Reece et al. |
| 2011/0088757 | A1 | 4/2011 | Highgate et al. |
| 2012/0097541 | A1 | 4/2012 | Yazdanbod |
| 2012/0168318 | A1 | 7/2012 | Ueno et al. |
| 2012/0309045 | A1 | 12/2012 | Knutson et al. |
| 2012/0312737 | A1 | 12/2012 | Miller |
| 2013/0041353 | A1 | 2/2013 | Shin et al. |
| 2013/0168228 | A1 | 7/2013 | Ozin et al. |
| 2015/0298100 | A1 | 10/2015 | Hill et al. |
| 2016/0067669 | A1 | 3/2016 | Willey et al. |
| 2016/0158690 | A1 | 6/2016 | Puxty et al. |
| 2016/0310899 | A1 | 10/2016 | Bordain et al. |
| 2017/0320053 | A1 | 11/2017 | Moon et al. |
| 2017/0373335 | A1 | 12/2017 | Aetukuri et al. |
| 2018/0065095 | A1 | 3/2018 | Ardo et al. |
| 2018/0145271 | A1 | 5/2018 | Kedem et al. |
| 2019/0134570 | A1 | 5/2019 | Pintauro et al. |
| 2020/0140293 | A1 | 5/2020 | Ardo et al. |
| 2023/0374674 | A1 | 11/2023 | Blanchet |

FOREIGN PATENT DOCUMENTS

| | | | | |
|---|---|---|---|---|
| WO | 2014032751 A1 | 3/2014 | | |
| WO | WO-2014035919 A2 * | 3/2014 | ............... | C25B 9/60 |
| WO | 2018049061 A1 | 3/2018 | | |
| WO | 0205933 A1 | 1/2022 | | |

OTHER PUBLICATIONS

WIPO, “International Search Report and Written Opinion”, issued in connection with PCT Patent Application No. PCT/ US2025/ 059721, dated Mar. 9, 2026, 10 pages.
Tributsch, Helmut. “Light driven proton pumps.” Ionics 6.3 (2000): 161-171.
Steinberg-Yfrach, et al. “Conversion of light energy to proton potential in liposomes by artificial photosynthetic reaction centres.” Nature 385.6613 (1997): 239-241.
Xie et al. “Photocurrent generation based on a light-driven proton pump in an artificial liquid membrane.” Nature chemistry 6.3 (2014): 202-207.
Xie et al. “Supplementary Information, Photocurrent generation based on a light-driven proton pump in an artificial liquid membrane.” Nature chemistry 6.3 (2014): 15 pages.
Sun et al. “A simple light-driven transmembrane proton pump.” Proceedings of the National Academy of Sciences 93.20 (1996): 10758-10762.
Kolbe, Michael, et al. “Structure of the light-driven chloride pump halorhodopsin at 1.8 Å resolution.” Science 288.5470 (2000): 1390-1396.
White et al. “Conversion of visible light into ionic power using photoacid-dye-sensitized bipolar ion-exchange membranes.” Joule 2.1 (2018): 94-109.
Reiter, Ronald. Electrochemical Evaluation of Bipolar Ion-Exchange Membranes for Solar Fuels. Diss. UC Irvine, 2015.
Chambers et al. “Efficient photochemical dihydrogen generation initiated by a bimetallic self-quenching mechanism.” Journal of the American Chemical Society 138.41 (2016): 13509-13512.
Stewart et al. “Accelerating slow excited state proton transfer.” Proceedings of the National Academy of Sciences 110.3 (2013): 876-880.
Mauzerall et al. “A simple light-driven transmembrane proton pump.” Proceedings of the National Academy of Sciences 93.20 (1996): 10758-10762.
Murphy, “Model systems in photoelectrochemical energy conversion.” Solar Energy 21.5 (1978): 403-407.
Sanborn et al. “Photoelectrochemical Ion Pumping with Dye-Functionalized Polymer Membranes.” ECS Meeting Abstracts. No. 37. IOP Publishing, 2015.
White et al. “Sunlight-Driven Ionic Power Generation from Bipolar Ion-Exchange Membranes Functionalized with Photoacids.” ECS Meeting Abstracts. No. 38. IOP Publishing, 2016.
White et al. “Observation of photovoltaic action from photoacid-modified nafion due to light-driven ion transport.” Journal of the American Chemical Society 139.34 (2017): 11726-11733.
Li et al. “Comb-shaped polymers to enhance hydroxide transport in anion exchange membranes.” Energy & Environmental Science 5.7 (2012): 7888-7892.
Wang et al. “Alkaline stability of poly (phenylene oxide) based anion exchange membranes containing imidazolium cations.” Journal of the Electrochemical Society 163.8 (2016): F824.
Lashkaryov,. “Investigations of a barrier layer by the thermoprobe method.” Izv. Akad. Nauk SSSR, Ser. Fiz 5.4-5 (1941): 442-446.
Fuller, “Some analogies between semiconductors and electrolyte solutions.” Rec. Chem. Prog 17.2 (1956): 75-93.
Chapin et al. “A new silicon pn junction photocell for converting solar radiation into electrical power.” Semiconductor Devices: Pioneering Papers. 1991. 969-970.
Lovrecek et al. “Electrolytic junctions with rectifying properties.” The Journal of Physical Chemistry 63.5 (1959): 750-751.
Maslov et al. “Water as a Semiconductor.” Russian Chemical Reviews 37.4 (1968): 310.

(56) References Cited

OTHER PUBLICATIONS

Pearson et al. "Electrical properties of pure silicon and silicon alloys containing boron and phosphorus." Physical Review 75.5 (1949): 865.
Roses et al. "Autoprotolysis in aqueous organic solvent mixtures." Analytical Chemistry 65.17 (1993): 2294-2299.
Rondinini et al. "Autoprotolysis constants in nonaqueous solvents and aqueous organic solvent mixtures." Pure and Applied Chemistry 59.12 (1987): 1693-1702.
Würfel, P. "Physics of solar cells: From principles to new concepts. Verlag Gmbh & Co KGaA." (2005), 188 pages.
Battaglia et al. "High-efficiency crystalline silicon solar cells: status and perspectives." Energy & Environmental Science 9.5 (2016): 1552-1576.
Shockley et al. "Detailed balance limit of efficiency of p-n junction solar cells." Journal of applied physics 32.3 (1961): 510-519.
Würthner et al. "J-aggregates: from serendipitous discovery to supramolecular engineering of functional dye materials." Angewandte Chemie International Edition 50.15 (2011): 3376-3410.
Ardo, et al. "Excited-state electron transfer from ruthenium-polypyridyl compounds to anatase TiO2 nanocrystallites: evidence for a stark effect." The Journal of Physical Chemistry B 114.45 (2010): 14596-14604.
Ardo et al. "Stark effects after excited-state interfacial electron transfer at sensitized TiO2 nanocrystallites." Journal of the American Chemical Society 132.19 (2010): 6696-6709.9.
Pensack et al. "Ultrafast vibrational spectroscopy of charge-carrier dynamics in organic photovoltaic materials." Physical Chemistry Chemical Physics 11.15 (2009): 2575-2591.
Zhang et al. "Imidazolium functionalized polysulfone anion exchange membrane for fuel cell application." Journal of Materials Chemistry 21.34 (2011): 12744-12752.
Wang et al. "Preparation of alkaline anion exchange membranes based on functional poly (ether-imide) polymers for potential fuel cell applications." Journal of Membrane Science 326.1 (2009): 4-8.
Luo et al. "Diffusion dialysis of hydrochloride acid at different temperatures using PPO—SiO2 hybrid anion exchange membranes." Journal of Membrane Science 347.1-2 (2010): 240-249.
Khan et al. "Development of BPPO-based anion exchange membranes for electrodialysis desalination applications." Desalination 391 (2016): 61-68.
Merle et al. "Anion exchange membranes for alkaline fuel cells: A review." Journal of Membrane Science 377.1-2 (2011): 1-35.
Reiter et al. "Communication-electrochemical characterization of commercial bipolar membranes under electrolyte conditions relevant to solar fuels technologies." Journal of the Electrochemical Society 163.4 (2016): H3132.
Ünlü et al. "Hybrid anion and proton exchange membrane fuel cells." The Journal of Physical Chemistry C 113.26 (2009): 11416-11423.
Grew et al. "Understanding transport at the acid-alkaline interface of bipolar membranes." Journal of the Electrochemical Society 163.14 (2016): F1572.
Warrick et al. "Viscosity effects on ion-recombination kinetics. Bromocresol green in water-glycerol mixtures." The Journal of Physical Chemistry 76.8 (1972): 1184-1191.
Hegedus et al. "Electrolyte transistors: ionic reaction- diffusion systems with amplifying properties." The Journal of Physical Chemistry A 102.32 (1998): 6491-6497.
Spry et al. "Proton transfer and proton concentrations in protonated Nafion fuel cell membranes." The Journal of Physical Chemistry B 113.30 (2009): 10210-10221.
Eames et al. "Ionic transport in hybrid lead iodide perovskite solar cells." Nature communications 6.1 (2015): 1-8.
Bag et al. "Kinetics of ion transport in perovskite active layers and its implications for active layer stability." Journal of the American Chemical Society 137.40 (2015): 13130-13137.
Fabian et al. "Hybrid organic-inorganic solar cells based on bismuth iodide and 1, 6-hexanediammonium dication." Journal of Materials Chemistry A 4.18 (2016): 6837-6841.
Chen et al. "Spectral properties and dynamics of gold nanorods revealed by EMCCD-based spectral phasor method." Microscopy research and technique 78.4 (2015): 283-293.
Piprek et al. "Electroluminescent cooling mechanism in InGaN/GaN light-emitting diodes." Optical and Quantum Electronics 48.10 (2016): 1-7.
J. Luo et al. "Water photolysis at 12.3% efficiency via perovskite photovoltaics and Earth-abundant catalysts", Science 345 (2014) 1593-1596, https://doi. org/10.1126/science.1258307.
Miller et al. "Strong internal and external luminescence as solar cells approach the Shockley-Queisser limit." IEEE Journal of Photovoltaics 2.3 (2012): 303-311.
Man et al. "Universality in oxygen evolution electrocatalysis on oxide surfaces." ChemCatChem 3.7 (2011): 1159-1165.
Sanehira et al. "Enhanced mobility CsPbI3 quantum dot arrays for record-efficiency, high-voltage photovoltaic cells." Science advances 3.10 (2017): eaao4204.
Protesescu et al. "Nanocrystals of cesium lead halide perovskites (CsPbX3, X=Cl, Br, and I): novel optoelectronic materials showing bright emission with wide color gamut." Nano letters 15.6 (2015): 3692-3696.
Fountaine et al. "Efficiency limits for photoelectrochemical water-splitting." Nature communications 7.1 (2016): 1-9.
Sahiner, Nurettin, and Selin Sagbas. "The preparation of poly (vinyl phosphonic acid) hydrogels as new functional materials for in situ metal nanoparticle preparation." Colloids and Surfaces A: Physicochemical and Engineering Aspects 418 (2013): 76-83.
Pekel, N., and O. Güven. "Investigation of complex formation between poly (N-vinyl imidazole) and various metal ions using the molar ratio method." Colloid and Polymer Science 277 (1999): 570-573.
James et al. "Voltage-gated ion transport through semiconducting conical nanopores formed by metal nanoparticle-assisted plasma etching." Nano letters 12.7 (2012): 3437-3442.
Guan et al. "Field-effect reconfigurable nanofluidic ionic diodes." Nature communications 2.1 (2011): 1-8.
Guan et al. "Voltage gated ion and molecule transport in engineered nanochannels: theory, fabrication and applications." Nanotechnology 25.12 (2014): 122001.
Ardo et al. "Systems and methods for integrated solar photodialysis." U.S. Appl. No. 16/367,102.
Xiao et al. "Artificial light-driven ion pump for photoelectric energy conversion." Nature communications 10.1 (2019): 1-7.
Siwy et al. "Fabrication of a synthetic nanopore ion pump." Physical Review Letters 89.19 (2002): 198103.
Siwy et al. "A nanodevice for rectification and pumping ions." American Journal of Physics 72.5 (2004): 567-574.
Sanborn et al. "Interfacial and nanoconfinement effects decrease the excited-state acidity of polymer-bound photoacids." Chem 5.6 (2019): 1648-1670.
Kedem et al. "How to drive a flashing electron ratchet to maximize current." Nano letters 17.9 (2017): 5848-5854.
Tarlie et al. "Optimal modulation of a Brownian ratchet and enhanced sensitivity to a weak external force." Proceedings of the National Academy of Sciences 95.5 (1998): 2039-2043.
Kedem et al. "Mechanisms of Symmetry Breaking in a Multidimensional Flashing Particle Ratchet." ACS nano 11.7 (2017): 7148-7155.
Kedem et al. "Light-responsive organic flashing electron ratchet." Proceedings of the National Academy of Sciences 114.33 (2017): 8698-8703.
Yan et al. "The balance of electric field and interfacial catalysis in promoting water dissociation in bipolar membranes." Energy & Environmental Science 11.8 (2018): 2235-2245.
Lau et al. "An introduction to ratchets in chemistry and biology." Materials Horizons 4.3 (2017): 310-318.
Lehmann, V. "The physics of macropore formation in low doped n-type silicon." Journal of the Electrochemical Society 140.10 (1993): 8 pages.
Kedem et al. "Cooperative Transport in a Multi-Particle, Multi-Dimensional Flashing Ratchet." The Journal of Physical Chemistry C 123.11 (2019): 6913-6921.
United Nations, "Water Scarcity", accessed Mar. 31, 2022; 5 pages.

(56) References Cited

OTHER PUBLICATIONS

Li et al. "Solar assisted sea water desalination: A review." Renewable and Sustainable Energy Reviews 19 (2013): 136-163.
Liu et al. "Experimental analysis of a portable atmospheric water generator by thermoelectric cooling method." Energy Procedia 142 (2017): 1609-1614.
Swiss Water Tech Research & Development, "Atmosphere Water Generator (AWG)" accessed Mar. 31, 2022, 6 pages.
U.S. Energy Information Administration, "Use of energy explained Energy use in homes" (2021) 5 pages.
U.S. Energy Information Administration, "Space heating and water heating account for nearly two thirds of U.S. home energy use" (2018) 3 pages.
U.S. Energy Information Administration, "Heating and cooling no longer majority of U.S. home energy use" (2013) 2 pages.
Nemova et al. "Laser cooling of solids." Reports on Progress in Physics 73.8 (2010): 086501.
Sheik-Bahae et al. "Optical refrigeration." nature photonics 1.12 (2007): 693-699.
Zhang et al. "Laser cooling of a semiconductor by 40 kelvin." Nature 493.7433 (2013): 504-508.
Seletskiy et al. "Laser cooling of solids to cryogenic temperatures." Nature Photonics 4.3 (2010): 161-164.
Santhanam et al. "Thermoelectrically pumped light-emitting diodes operating above unity efficiency." Physical Review Letters 108.9 (2012): 097403.
Chen et al. "High-performance near-field electroluminescent refrigeration device consisting of a Gas light emitting diode and a Si photovoltaic cell." Journal of Applied Physics 122.14 (2017): 143104.
Xiao et al. "Electroluminescent refrigeration by ultra-efficient GaAs light-emitting diodes." Journal of Applied Physics 123.17 (2018): 173104.
Zhao et al. "Self-sustaining thermophotonic circuits." Proceedings of the National Academy of Sciences 116.24 (2019): 11596-11601.
Lin et al. "Near-field enhancement of thermoradiative devices." Journal of Applied Physics 122.14 (2017): 143102.
U.S. Environmental Protection Agency, "How we use Water" accessed Mar. 31, 2022, 9 pages.
SunPower Corporation, "Solar Panels Based on Maxeon Solar Cell Technology" accessed Mar. 31, 2022, 7 pages.
Brackmann, "Laser Dyes" 3rd edition, (2000) 294 pages.
Luxottica / Exciton, "Laser Dyes" accessed Mar. 31, 2022, 11 pages.
Li et al. "Combined theoretical and experimental study of band-edge control of Si through surface functionalization." The Journal of Physical Chemistry C 117.10 (2013): 5188-5194.
Mongin et al. "Thermally activated delayed photoluminescence from pyrenyl-functionalized CdSe quantum dots." Nature Chemistry 10.2 (2018): 225-230.
Lewis, Nathan S. "A Quantitative Investigation of the Open-Circuit Photovoltage at the Semiconductor/Liquid Interface." Journal of the Electrochemical Society 131.11 (1984): 2496.
Grimm et al. "Comparison of the photoelectrochemical behavior of H-terminated and methyl-terminated Si (111) surfaces in contact with a series of one-electron, outer-sphere redox couples in CH3CN." The Journal of Physical Chemistry C 116.44 (2012): 23569-23576.
Optical Properties of Silicon'. PVEDUCATION, May 25, 2018 {May 25, 2018). p. 1-3. [retrieved 27 4.9 Mar. 2, 2020 {Mar. 2, 2020) from<https:web.archive.org web/20 180525182157/https:Www. pveducation .org/pvcdrom/.
Seletskiy et al. "Local laser cooling of Yb: YLF to 110 K." Optics express 19.19 (2011): 18229-18236.
Yu et al. "Fundamental mechanisms of electroluminescence refrigeration in heterostructure light-emitting diodes." Light-Emitting Diodes: Research, Manufacturing, and Applications XI. vol. 6486. SPIE, 2007.
Ramirez et al. "Current-voltage curves of bipolar membranes." Journal of applied physics 72.1 (1992): 259-264.
Mafé et al. "Electric field-assisted proton transfer and water dissociation at the junction of a fixed-charge bipolar membrane." Chemical Physics Letters 294.4-5 (1998): 406-412.
Mafe et al. "Electrochemical characterization of polymer ion-exchange bipolar membranes." Acta polymerica 48.7 (1997): 234-250.
Email communication from ProQuest to Examiner Raphael, Nov. 3, 2020 (Year: 2020) 1 page.
Gopidas et al. "Photochemistry in polymers: photoinduced electron transfer between phenosafranine and triethylamine in perfluorosulfonate membrane." Journal of Physical Chemistry 94.11 (1990): 4723-4727.
Johns et al. "Visible light activated ion sensing using a photoacid polymer for calcium detection." Analytical chemistry 86.13 (2014): 6184-6187.
Mohan et al. "Photochemical behaviour of rhodamine 6G in Nafion membrane." Journal of the Chemical Society, Faraday Transactions 88.1 (1992): 41-45.
Krishnan et al. "Integrated chemical systems: photocatalysis at semiconductors incorporated into polymer (Nafion)/mediator systems." Journal of the American Chemical Society 105.23 (1983): 7002-7003.
Mistlberger et al. "Photoresponsive ion extraction/release systems: dynamic ion optodes for calcium and sodium based on photochromic spiropyran." Analytical chemistry 85.5 (2013): 2983-2990.
O'Donnell et al. "Photoacidic and photobasic behavior of transition metal compounds with carboxylic acid group (s)." Journal of the American Chemical Society 138.11 (2016): 3891-3903.
Murphy, G. W. "Model systems in photoelectrochemical energy conversion." Solar Energy 21.5 (1978): 403-407.
Astom Corporation, "Comparison table for detailed specification of Cation/Anion Exchange Membrane". 2013, 1 page; http://www.astom-corp.jp/en/product/images/astom_hyo.pdf.
Tran et al. "The United Nations World Water Development Report, 2016: Water and Jobs: Facts and Figures." 2016, 12 pages.
Worldbank, "Water Overview" 2017, 3 pages; http://www.worldbank.org/en/topic/water/overview.
Ardo, S. Development of a Plastic Water Bottle for Sunlight-Driven Desalination. Distinctive Voices Lecture Series; National Academy of Sciences, 2017, 1 page; https://www.youtube.com/watch?v=F3h41nPIjXY.
World Health Organization, "Total Dissolved Solids in Drinking-Water" Heal. criteria other Support. Inf. (1996) 8 pages.
Bell System Solar Battery Converts Sun's Ray into Electricity! Look Magazine. 1956, 1 page.
Haussener et al. "Modeling, simulation, and design criteria for photoelectrochemical water-splitting systems." Energy & Environmental Science 5.12 (2012): 9922-9935.
Hu et al. "An analysis of the optimal band gaps of light absorbers in integrated tandem photoelectrochemical water-splitting systems." Energy & Environmental Science 6.10 (2013): 2984-2993.
Xiang et al. "Modeling, simulation, and implementation of solar-driven water-splitting devices." Angewandte Chemie International Edition 55.42 (2016): 12974-12988.
Chandran et al. "Evaluating particle-suspension reactor designs for Z-scheme solar water splitting via transport and kinetic modeling." Energy & Environmental Science 11.1 (2018): 115-135.
Keene et al. "Calculations of theoretical efficiencies for electrochemically-mediated tandem solar water splitting as a function of bandgap energies and redox shuttle potential." Energy & Environmental Science 12.1 (2019): 261-272.
Wang et al. "Scalable water splitting on particulate photocatalyst sheets with a solar-to-hydrogen energy conversion efficiency exceeding 1%." Nature materials 15.6 (2016): 611-615.
Fabian et al. "Particle suspension reactors and materials for solar-driven water splitting." Energy & Environmental Science 8.10 (2015): 2825-2850.
Goto et al. "A particulate photocatalyst water-splitting panel for large-scale solar hydrogen generation." Joule 2.3 (2018): 509-520.
Eisler et al. "Multijunction solar cell efficiencies: effect of spectral window, optical environment and radiative coupling." Energy & Environmental Science 7.11 (2014): 3600-3605.

(56) References Cited

OTHER PUBLICATIONS

Tiedje et al. "Limiting efficiency of silicon solar cells." IEEE Transactions on electron devices 31.5 (1984): 711-716.
Chuang et al. "Open-circuit voltage deficit, radiative sub-bandgap states, and prospects in quantum dot solar cells." Nano letters 15.5 (2015): 3286-3294.
Swarnkar et al. "Quantum dot-induced phase stabilization of α-CsPbl3 perovskite for high-efficiency photovoltaics." Science 354.6308 (2016): 92-95.
Yang et al. "High-performance photovoltaic perovskite layers fabricated through intramolecular exchange." Science 348.6240 (2015): 1234-1237.
Kulkarn et al. "Band-gap tuning of lead halide perovskites using a sequential deposition process." Journal of Materials Chemistry A 2.24 (2014): 9221-9225.
Wikipedia, "Silicon". Oct. 28, 2018, . p. 1-3.
Balster et al. "Tailoring the interface layer of the bipolar membrane." Journal of membrane science 365.1-2 (2010): 389-398.
Wilhelm, Friedrich G. "Bipolar membrane electrodialysis." University of Twente (2001) 242 pages.
Zhang et al. ""Uphill" cation transport: a bioinspired photo-driven ion pump." Science advances 2.10 (2016): e1600689.
Mei et al. "Gate modulation of proton transport in a nanopore." Physical Chemistry Chemical Physics 18.10 (2016): 7449-7458.

* cited by examiner

PHOTOCATALYST SUSPENSION REACTOR FOR SOLAR FUEL FORMATION

CROSS-REFERENCES TO RELATED APPLICATIONS

This application is a non-provisional and claims benefit of U.S. Provisional Application No. 63/349,442 filed Jun. 6, 2022, the specification of which is incorporated herein in its entirety by reference.

STATEMENT REGARDING FEDERALLY SPONSORED RESEARCH OR DEVELOPMENT

This invention was made with government support under Grant No. DE-EE0007602, DE-EE0008838, and DE-EE0006963 awarded by the Department of Energy (DOE), Office of Energy Efficiency and Renewable Energy (EERE). The government has certain rights in the invention.

FIELD OF THE INVENTION

The present invention is directed to methods and devices for converting sunlight into chemical fuel.

BACKGROUND OF THE INVENTION

Society requires a means by which renewable energy can be stored cleanly for long periods of time, e.g. seasons, and used with high efficiency when energy is needed. $H_2$ is the simplest molecule/fuel that satisfies this need, being clean when formed via water electrolysis/splitting and useful as an energy-efficient fuel in fuel cell electric vehicles with its transportation via our current infrastructure, e.g. existing pipelines. However, no technology exists that can generate clean and inexpensive $H_2$ for renewable energy storage, a transportation fuel, and a chemical feedstock for the production of ammonia, among other chemicals. Some sunlight-driven designs are projected to result in $H_2$ that is too expensive and/or unsafe on large scales, because they consist of photovoltaic-grade materials, use large amounts of glass, and/or present explosive hazards. Moreover, using solar electricity at utility-scale future prices of $0.02/kWh to drive ambient-temperature water electrolysis at its thermoneutral voltage in an electrolyzer requires $0.80/kg-$H_2$, which leaves too little cost for all other aspects of a reactor, if a cost-competitive target of $1/kg-$H_2$ is to be met. This means that there are no credible pathways to meet humanity's renewable energy storage needs in order to curb global warming.

Photoelectrochemical (PEC) production of hydrogen is a promising renewable energy technology for the generation of hydrogen for use in the future hydrogen economy. Some PEC systems use solar photons to generate a sufficient voltage to drive an integrated electrolysis cell, driving water electrolysis to produce $H_2$ and 02 gasses. However, such designs still incorporate many of the device considerations used in photovoltaics and electrolyzers, resulting in projected costs that exceed $1/kg-$H_2$. Other PEC systems are photocatalytic, consisting of photocatalyst particles, with properties and needs that may differ from those used in the photovoltaics and electrolyzer communities. A major advantage of photocatalytic systems is that they involve relatively simple process steps as compared to many other $H_2$ production systems. Additionally, they possess wide operating temperature ranges, with no intrinsic upper-temperature limit and a lower temperature of slightly below 0° C. without a warm-up period, and well below 0° C. with a warm-up period dependent on outside temperature. The primary challenges for photocatalytic systems are to develop materials with sufficient photovoltage to electrolyze water, to minimize internal resistance losses, to have a long lifetime (particularly corrosion life), to maximize photon utilization efficiencies, and to reduce plant capital cost.

BRIEF SUMMARY OF THE INVENTION

It is an objective of the present invention to provide methods and devices that allow for converting sunlight into chemical fuel, as specified in the independent claims. Embodiments of the invention are given in the dependent claims. Embodiments of the present invention can be freely combined with each other if they are not mutually exclusive.

The present invention is a new reactor design that can be used to convert sunlight into chemical fuel, such as $H_2$ via water splitting, on enormous global scales. This process is clean as it produces no $CO_2$ byproducts during $H_2$ fuel production. The included diagrams and analyses support the innovations of the present design and its projected low cost for $H_2$. While shown for $H_2$ generation via water splitting, this invention is not limited to water splitting as other reactions can also be performed in reactors of similar design, such as $CO_2$ reduction, $N_2$ reduction, $H_2O_2$ formation, etc., and especially those that generate gaseous reaction products.

The present invention features a photocatalyst suspension reactor for solar fuel formation. In some embodiments, the reactor may comprise a shallow pool filled with a first portion of an electrolyte solution. The electrolyte solution may comprise a solvent, which is typically water, a plurality of redox shuttle molecules, and a plurality of photocatalyst particles. The reactor may further comprise a plurality of tubes disposed on a surface of the shallow pool, each tube of the plurality of tubes comprising an upper half and a lower half. The upper half may comprise a transparent material configured to be minimally permeable to hydrogen gas and oxygen gas. The lower half may be configured to be filled with a second portion of the electrolyte solution and comprises an ion bridge material permeable to the plurality of redox shuttle molecules or mediating electron and ion transport, and minimally permeable to the plurality of photocatalyst particles. In some embodiments, the ion bridge may be electrically conductive and perform a pair of redox reactions (one on each side) to pass electrons across—which can move faster than the redox shuttle—as well as ions or protons, possibly achieving more rapid effective mixing of the shuttle than if the shuttle had to permeate.

The plurality of photocatalysts may be configured to catalyze an oxygen evolution reaction in the first portion of the electrolyte solution, yielding oxygen gas, and a plurality of charged particles (i.e. protons, ions, electrons). The redox shuttle molecules may be configured to transmit the plurality of charged particles from the first portion of the electrolyte solution to the second portion of the electrolyte solution such that the plurality of photocatalyst particles in the second portion of the electrolyte solution catalyzes a hydrogen evolution reaction, yielding hydrogen gas. The reactor may further comprise a gas handling subassembly fluidly coupled to the plurality of tubes, configured to accept the hydrogen gas and convert the hydrogen gas into energy.

Uniquely, the reactor of the present invention requires no forced convection, which constituted the largest capital cost of prior designs. Moreover, the reactor of the present invention presents a tandem light-absorption advantage to enable larger energy conversion efficiencies and consists of inexpensive plastic materials. In some embodiments, the present invention may passively vent the benign $O_2$ byproduct to the atmosphere, because it is considered to have almost no economic value at large scales. Lastly, the present invention benefits from the advantages of increased efficiency over most other designs that resemble photovoltaics coupled to electrolyzers, due to having an ensemble of particles, as described in prior inventions such as US20200140293A1 "Optically thin light-absorbers for increasing photochemical energy-conversion efficiencies."

One of the unique and inventive technical features of the present invention is the obviation of PVC piping and separation of $H_2$ evolution reaction components and $O_2$ evolution reaction components such that $O_2$ gas is dispersed into the atmosphere and explosive mixtures of $H_2$ and $O_2$ will not form. Without wishing to limit the invention to any theory or mechanism, it is believed that the technical feature of the present invention advantageously provides for a cost- and energy-efficient method of production of $H_2$ fuel from sunlight and water, without generating any $CO_2$ byproducts, through passive diffusion and/or natural convection. None of the presently known prior references or work has this combination of unique inventive technical features of the present invention.

Furthermore, the inventive technical feature of the present invention is counterintuitive. The reason that it is counterintuitive is that prior systems teach away from the inventive technical feature. Prior systems teach the use of forced convection for controlling the transfer of the hydrogen and oxygen gas products of the evolution reactions. The present invention implements a separation between $H_2$ evolution reaction components and $O_2$ evolution reaction components. This separation allows for the present invention to obviate forced convection and allow the gas products of the evolution reactions to flow into their necessary endpoints naturally without the need for pumps. Thus, the prior systems teach away from the features of the present invention and the inventive technical feature is counterintuitive.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE SEVERAL VIEWS OF THE DRAWING(S)

The features and advantages of the present invention will become apparent from a consideration of the following detailed description presented in connection with the accompanying drawings in which.

DETAILED DESCRIPTION OF THE INVENTION

Figure 1:
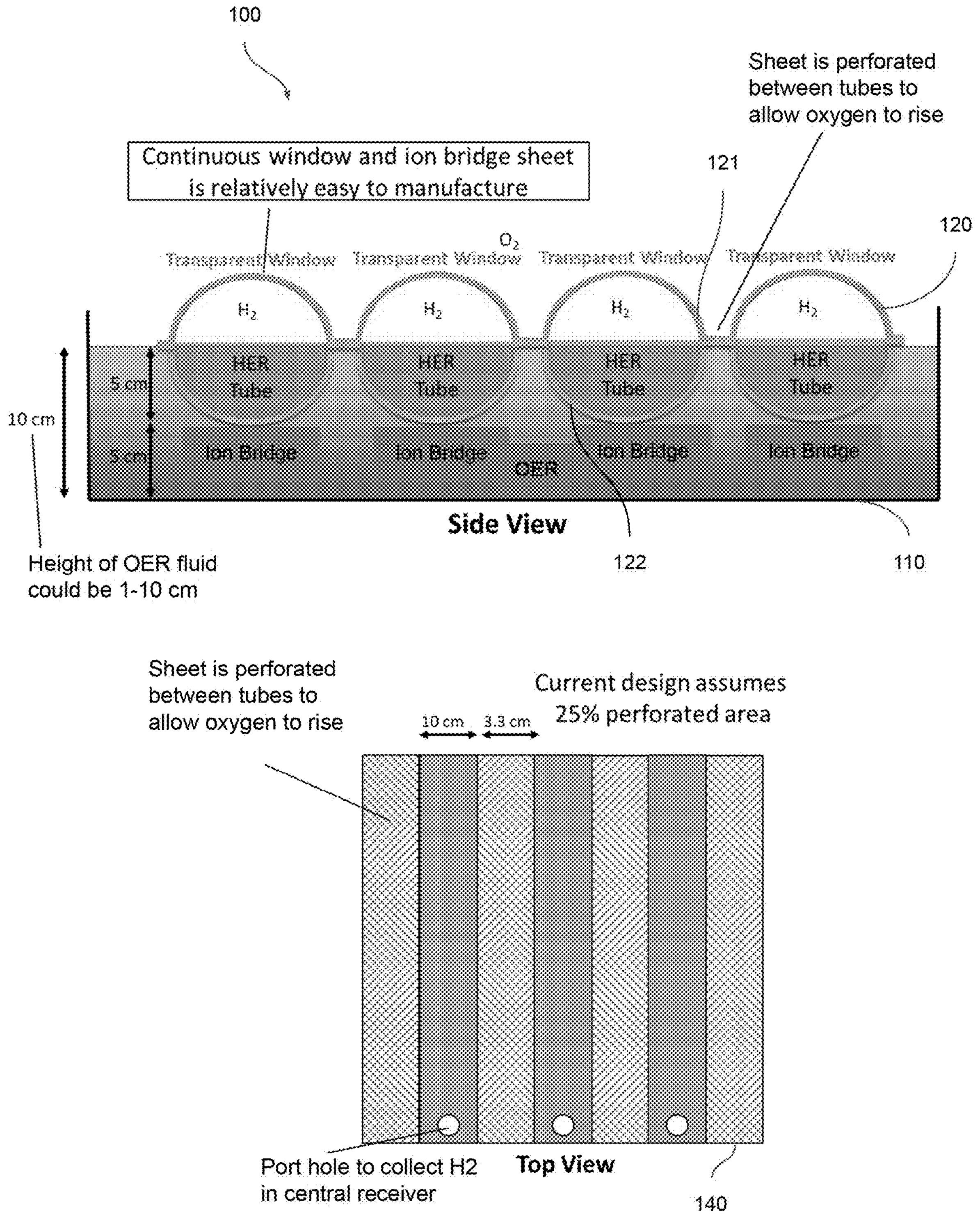
FIG. 1 shows a side view and top view of a floating cylinder system.

Referring now to FIGS. 1-4, the present invention features a photocatalyst suspension reactor (100) for solar fuel formation. In some embodiments, the reactor (100) may comprise a shallow pool (110) filled with a first portion of an electrolyte solution. The electrolyte solution may comprise a solvent, which is typically water, a plurality of redox shuttle molecules, and a plurality of photocatalyst particles. The reactor (100) may further comprise a plurality of tubes (120) disposed on a surface of the shallow pool (110), each tube of the plurality of tubes (120) comprising an upper half (121) and a lower half (122).

The upper half (121) may comprise a transparent material configured to be minimally permeable to hydrogen gas and oxygen gas. The lower half (122) may be configured to be filled with a second portion of the electrolyte solution and comprises an ion bridge material permeable to the plurality of redox shuttle molecules and minimally permeable to the plurality of photocatalyst particles.

The plurality of photocatalysts may be configured to catalyze an oxygen evolution reaction in the first portion of the electrolyte solution, yielding oxygen gas, a plurality of charged particles (i.e. protons, ions, electrons). The redox shuttle particles may be configured to transmit the plurality of charged particles from the first portion of the electrolyte solution to the second portion of the electrolyte solution such that the plurality of photocatalyst particles in the second portion of the electrolyte solution catalyzes a hydrogen evolution reaction, yielding hydrogen gas. The reactor (100) may further comprise a gas handling subassembly (130) fluidly coupled to the plurality of tubes (120), configured to accept the hydrogen gas and convert the hydrogen gas into energy.

In some embodiments, the plurality of photocatalysts may comprise metal oxides comprising $Fe_2O_3$ particles, $SrTiO_3$ (Al doped, Rh doped, Ir doped, Rh—La co-doped), $TiO_2$, $WO_3$, $BiVO_4$, oxynitrides comprising TaON and $BaTaO_2N$, metal sulfides comprising $(CuGa)_{0.8}Zn_{0.4}S_2$, $CuGaS_2$ and $Cu_3Nb_{0.9}V_{0.1}S_4$, nitrides comprising $Ta_3N_5$, or a combination thereof, each particle having a cocatalyst (discontinuous material), a species-selective coating on top of the cocatalysts (probably conformally coating the cocatalyst selectively and not the entire particle), or a combination thereof. This can be accomplished using photochemical deposition. In some embodiments, the cocatalyst may comprise a discontinuous anodic region of materials and/or molecules or a discontinuous cathodic region of materials and/or molecules. In some embodiments, the reactor may further comprise a plurality of oxygen-release components interdigitatably disposed between the plurality of tubes (120). In some embodiments, the plurality of oxygen release components may comprise a plurality of oxygen gas pumps configured to pump the oxygen gas from the shallow pool (110) to an external environment. In other embodiments, the plurality of oxygen release components may comprise a plurality of perforated surfaces (140) such that oxygen gas transfers from the shallow pool (110) through the plurality of perforated surfaces (140) to an external environment.

In some embodiments, the upper half (121) of each tube of the plurality of tubes (120) may comprise polypropylene, high-density polyethylene, or any commercial plastic that is minimally permeable to $H_2$ and maximally transparent and stable to sunlight. In some embodiments, the lower half (122) of each tube of the plurality of tubes (120) may comprise a transparent dialysis-type or a filter membrane separator material. In some embodiments, the reactor (100) may further comprise a solvent replenishment receptacle (160) configured to collect rainwater and direct the rainwater into the shallow pool (110). In some embodiments, an average amount of rainfall for a desert environment is sufficient. In some embodiments, the shallow pool (110) may comprise a rectangular shape. In some embodiments, the gas handling subassembly (130) may be fluidly coupled to the plurality of tubes (120) by a steel hydrogen outlet manifold (150) disposed at an end of the plurality of tubes (120). In some embodiments, the reactor (100) may further comprise one or more hydrogen gas pumps operatively coupled to the plurality of tubes (120) configured to pump the hydrogen gas from the plurality of tubes (120) to the gas handling subassembly (130). These pumps may be configured to pump out only the overpressurized hydrogen gas from the plurality of tubes (120) so as not to deflate the tubes.

In some embodiments, the same photocatalyst particles may be used in the first portion of the electrolyte solution and the second portion of the electrolyte portion. In other embodiments, the first portion of the electrolyte solution may comprise photocatalyst particles suitable for an oxygen evolution reaction and the second portion of the electrolyte solution may comprise photocatalyst particles suitable for a hydrogen evolution reaction. In other embodiments still, any number of photocatalysts with differing band gaps may be dispersed throughout an entirety of the electrolyte solution. The photocatalyst particles may be dense enough to gather at a bottom of the shallow pool (110)/the plurality of tubes (120), completely soluble in the electrolyte solution, or a combination thereof. The photocatalyst particles may be on the scale of microns, the scale of nanometers, the size of molecules, or a combination thereof.

In some embodiments, the plurality of tubes (120) may be disposed horizontally adjacent to each other in the shallow pool (110), allowing for each tube of the plurality of tubes (120) to contact an equal amount of sunlight. This is useful for embodiments where the same photocatalyst is used throughout the entirety of the electrolyte solution, allowing all particles to operate at maximum efficiency. In other embodiments, the plurality of tubes (120) may be disposed vertically in a stack in the shallow pool (110), allowing for sunlight to penetrate higher tubes into lower tubes. This is useful for embodiments where different photocatalysts with different band gaps are implemented, allowing the number of tubes in use to be maximized and each working at maximum efficiency for each photocatalyst used.

In some embodiments, the present invention features a photocatalyst suspension reactor (100). The reactor (100) may comprise a pool (110) containing a first portion of an electrolyte solution. In some embodiments, the electrolyte solution may comprise redox shuttle molecules and a photocatalyst. The reactor (100) may further comprise at least one tubular vessel partially submerged in the electrolyte solution, the tube comprising a floating portion (121) and a submerged portion (122). The floating portion (121) may comprise a transparent material configured to allow light to pass through and be minimally permeable to hydrogen gas and oxygen gas. The submerged portion (122) may contain a second portion of the electrolyte solution and comprises an ion bridge material permeable to the redox shuttle molecules and minimally permeable to the photocatalyst. The photocatalyst may be configured to catalyze an oxygen evolution reaction in the first portion of the electrolyte solution, yielding oxygen gas and a plurality of charged particles (i.e. protons, ions, electrons). The redox shuttle molecules may be configured to transport the plurality of charged particles from the first portion of the electrolyte solution to the second portion of the electrolyte solution such that the photocatalyst in the second portion of the electrolyte solution catalyzes a hydrogen evolution reaction, yielding hydrogen gas.

In some embodiments, the photocatalyst may comprise $Fe_2O_3$, $TiO_2$, $SrTiO_3$, ZnO, $SnO_2$, $WO_3$, $BiVO_4$, TaON, $BaTaO_2N$, $(CuGa)_{0.8}Zn_{0.4}S_2$, $CuGaS_2$, $Cu_3Nb_{0.9}V_{0.1}S_4$, and $Ta_3N_5$. In some embodiments, the photocatalyst may be light activated. In some embodiments, the oxygen may be vented out of the reactor. In some embodiments, the floating portion (121) may comprise polypropylene, high-density polyethylene, or a combination thereof. In some embodiments, the submerged portion (122) may comprise a transparent dialysis-type material or a filter membrane separator material.

In some embodiments, the photocatalysts may be coated with a cocatalyst material comprising metals (e.g. Pt, Ru, Ni, etc.) and ion-permeable oxides, nitrides, sulfides, etc. In some embodiments, the photocatalysts may be coated with a coating material comprising ion, electron, or mixed conducting materials, such as oxides, or any of the above materials used as the cocatalysts.

In some embodiments, the ion bridge may be electrically conductive and perform a pair of redox reactions (one on each side) to pass electrons across—which can move faster than the redox shuttle—as well as ions or protons, possibly achieving more rapid effective mixing of the shuttle than if the shuttle had to permeate. In some embodiments, a species-selective coating over the plurality of photocatalysts may be deposited selectively over cocatalysts for $H_2$ evolution, cocatalysts for $O_2$ evolution, or the photocatalyst surface to facilitate selective reactivity. The electrons must reduce protons and/or water to make $H_2$, but kinetically and thermodynamically it is more favored and faster to reduce the oxidized version of the redox shuttle over making $H_2$ so that has to be inhibited.

In some embodiments, the plurality of tubes may comprise 4 to 1000 tubes arranged in series, parallel, or a combination thereof. Each tube of the plurality of tubes may have a diameter of 10 cm or less and a length of 1 to 50 m. The upper half/floating portion of each tube of the plurality of tubes may have a transparency to sunlight of 50% to 99%. In some embodiments, the term "shallow" may refer to a pool with a depth of 2 to 30 cm. The pool may have dimensions of 5 to 200 m×5 to 200 m. In some embodiments, the term "minimally permeable" may refer to less than 5% of hydrogen/oxygen gas passage through the surface.

Example

The following is a non-limiting example of the present invention. It is to be understood that said example is not intended to limit the present invention in any way. Equivalents or substitutes are within the scope of the present invention.

The present invention may be termed photocatalytic, and separate the $H_2$ evolution reaction (HER) and the $O_2$ evolution reaction (OER) into separate compartments by locating only HER or OER photocatalysts in each compartments. This design is applicable to a large central plant producing 10-100 tonnes of $H_2$ per day composed of independent production modules operating in parallel. Each module is designed for a production rate of 1,000 kg $H_2$/day. Namely, the module will be a solar collection field with the photocatalytic technology of choice. In some embodiments, pumps will feed an aqueous electrolyte solution to the reactor. The $O_2$ can be vented to the atmosphere as waste or to storage (for pressurization and resale). The $H_2$ is pressured to 20 bar (300 psi) consistent with a typical pipeline pressure. The product $H_2$ is saturated with water vapor and purified to industrial grade quality (two 9's purity) using one condenser and two intercoolers. Further drying is not considered within this invention but could be achieved using a refrigeration cycle or a Temperature Swing Adsorption (TSA) system. The standard purity specification is five 9's purity.

The $H_2$ production rate per photon capture area can be calculated using the average annual insolation rate and the solar-to-hydrogen efficiency. Using Equation 1, the mass flow rate of $H_2$ generated can be found on a per area basis.

$$\frac{m}{A}\left(\frac{gH_2}{sec\cdot m^2}\right)=\frac{\eta_{STH}\cdot MW_{H_2}\cdot I_r}{n_{H_2}\cdot F\cdot E_{Eq}} \quad \text{(Equation 1)}$$

$E_{Eq}$=1.229 V, represents the Equilibrium potential at standard conditions. F=96,485 C $mol_{electron}^{-1}$ as the Faraday constant. $\eta_{STH}$=Solar To Hydrogen (STH) efficiency. $n_{H2}$=2, electrons per mol $H_2$ atom. $I_r$=Irradiance (W $m^{-2}$). $MW_{H2}$=2.016 g/mol, Molecular Weight of $H_2$. m=mass flow rate (kg/day). $I_s$ represents the insolation across a given photon capture area (HER bed size or concentrator platform area).

The present invention average annual irradiance rates (averaged over 24 h/day, 365 days/yr), are 240 W $m^{-2}$ and 311 W $m^{-2}$, respectively. With the area specific mass flow rate and a module mass flow rate (average of 1,000 kg $H_2$/day) the total Photon Capture Area (PCA) can be calculated (Equation 2).

$$PCA(m^2)=\left(\frac{m}{A}\right)^{-1}\frac{1{,}000\ kgH_2}{day}\,\frac{1\ day}{24\ hrs}\,\frac{1\ hr}{3{,}600\ secs} \quad \text{(Equation 2)}$$

The bulk raceway pool hosts the OER process, with the HER process occurring within long cylinders floating on the surface. Their locations could be switched, if desired. A schematic of the proposed design is shown in FIG. 1. For example, the top transparent window is made from High-Density Polyethylene (HDPE) film while the bottom ion bridge is made from polypropylene filter membrane. Other plastic materials can also be used for these components. It is hypothesized that the cylinders can be manufactured from a large sheet of HDPE and a large sheet of polypropylene filter membrane that are heated in a pattern so as to fuse the two materials together into long cylinders. The buoyancy of the evolved $H_2$ gas and the weight of the polypropylene ion bridge are expected to keep a generally circular cross-sectional shape to the HER baggie. The spacing between cylinders is perforated to allow $O_2$ evolved from raceway particles to vent to the atmosphere, in addition to allowing rainwater to pass into the raceway if desired due to costs and/or inconvenience if located remotely (i.e. in the middle of the desert) for physically transporting water to the reactor. In this design, it is assumed that the perforated region is 25% of the total surface area, i.e. a 3.3 cm span between cylinders. The specific dimensions of the pool height, the HER cylinders, the tubing spacing, and the amount of perforated region are subject to revision as a function of STH efficiency, transport distance of redox shuttle molecules, and light collection effectiveness. The ability of the system to promote passive mixing of suspended particles is particularly important to maximize light collection and improve ion diffusion efficiency.

Figure 2:
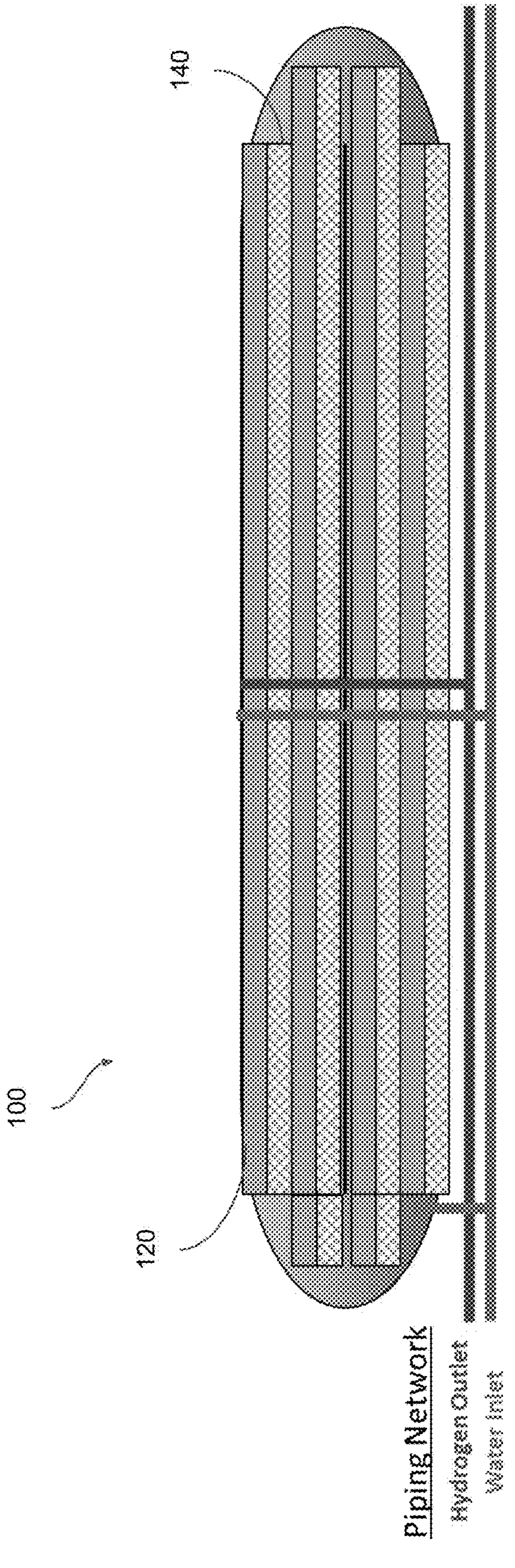
FIG. 2 shows a top view of a floating raceway with the proposed piping network.
Figure 3:
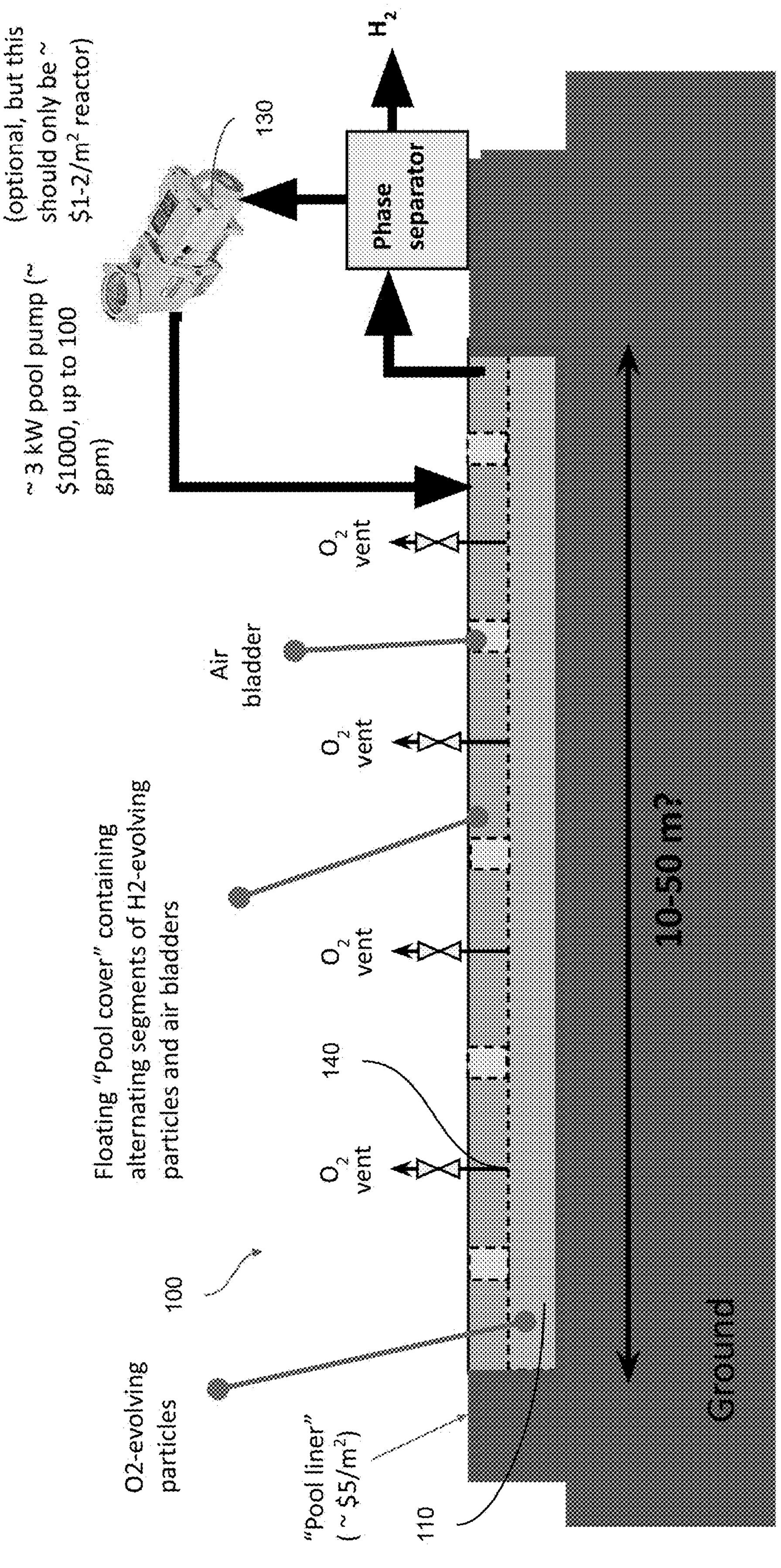
FIG. 3 shows a high-level side-view of some key features of the present invention in an alternative format.
Figure 4:
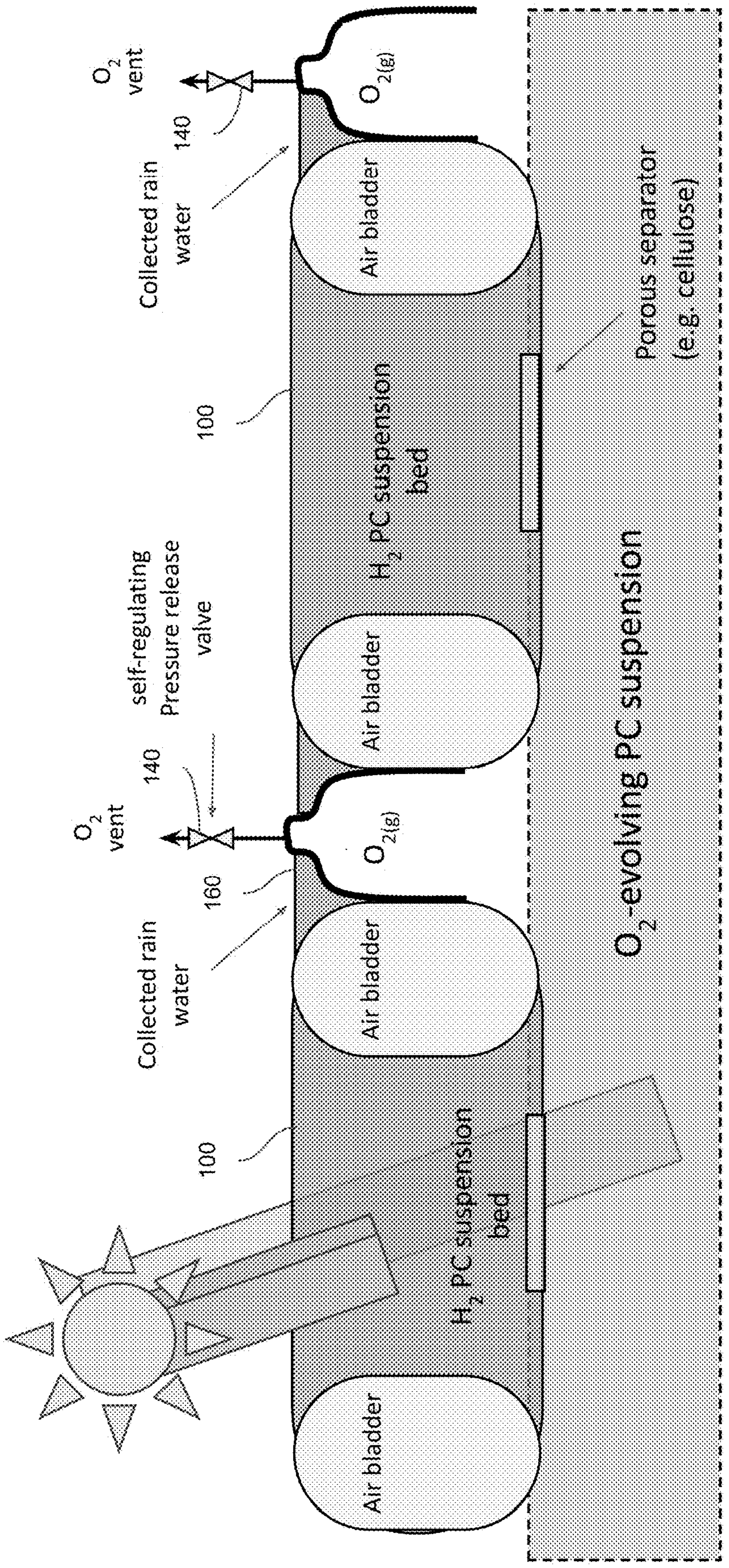
FIG. 4 shows a detailed cross-section of some of the key features of the "pool-cover"-inspired top bed.
Figure 5:
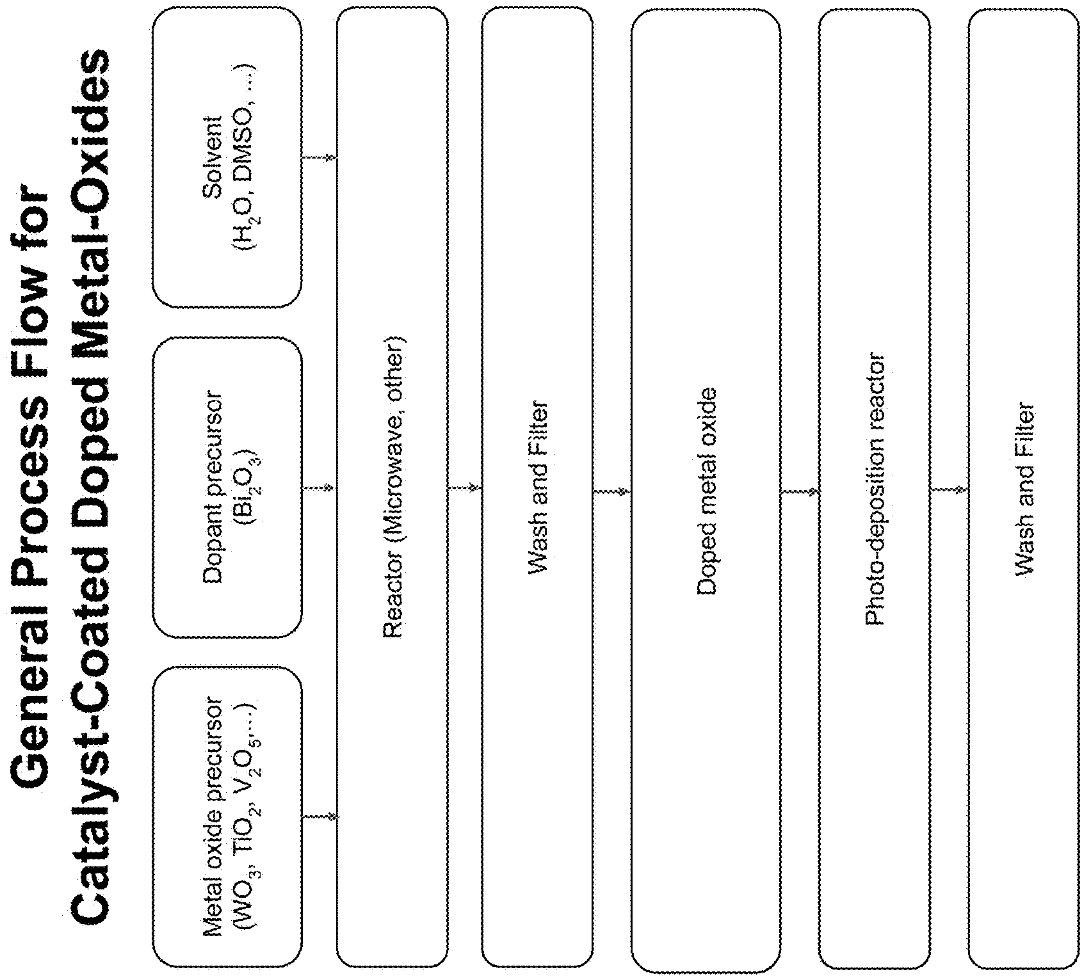
FIG. 5 shows a flow chart for generating catalyst-coated doped metal oxides for use as the active material in the present invention. In some embodiments, species-selective coatings can be deposited along with, or sequentially after, cocatalysts.

A top-down view of the entire raceway is shown in FIG. 2. Since the liquid level is only ~10 cm, the current raceway does not assume a paddlewheel is necessary, and natural convection will help mix the electrolyte and particles without added components. If further mixing of particles and ions is necessary, an additional system to induce mixing may be required, and options exist that may not increase the cost of $H_2$ too greatly.

Two piping networks are used to distribute water and the slurry and to collect the $H_2$ product. Each piping network consists of a main branch that connects all the raceways together and a branch pipe that is directly connected to each cylinder via a port valve. The water network has an additional branch that is connected to the pool. The water network provides clean water to both the pool and the cylinders, whereas the $H_2$ network collects $H_2$ product from the cylinders. During installation and maintenance of the raceways, it is imagined that an isolation valve will close off the main water pipe with the branching water pipes and the catalyst slurry can be distributed into the branches. A water purge can then be run into the pipe branches to clear them of slurry prior to normal operation.

Light extinction analysis suggests that a bed depth of 10 cm for a nanoparticle size of tens to hundreds of nm and a particle concentration of hundreds of nm equivalent thickness is sufficient to capture most above bandgap light entering the bed for prototypical photocatalyst particles. Equivalent thickness is defined as the depth of the particle layer if all particles settled to the bottom. For purposes of cost estimation, the nanoparticles are modeled as metal-oxide particles with Pt cocatalysts deposited on their surfaces at either high or low loading.

The present design comprises 1 condenser and 2 intercoolers coupled with an $H_2$ compressor to achieve product gas output purity of 99.6% $H_2$ and 0.4% water vapor. The hydrogen is cooled to 40° C. using cooling water to achieve this product purity. This is consistent with the hydrogen purity required for industrial applications but may be insufficient for transportation applications, which typically specify 99.999% $H_2$ purity.

In some embodiments, the present invention may implement a bed depth of 10 cm for a nanoparticle size of 40 nm and a particle concentration of 200 nm equivalent thickness of 40 nm particles is sufficient to capture a majority of the light entering the bed. Equivalent thickness is defined as the depth of the particle layer if all particles settled to the bottom. In a non-limiting embodiment, the PEC nanoparticles may comprise 40 nm particles upon which 5 nm layers of cocatalyst/coating materials have been deposited. Assuming even distribution, the required particle areal density is 0.00105 kg/$m^2$ for near-complete light extinction.

In some embodiments, the present invention may use 1 condenser and 2 intercoolers coupled with a hydrogen compressor to achieve a product gas output purity of 99.6% $H_2$ and 0.4% water vapor. The hydrogen is cooled to 40° C. using cooling water to achieve this product purity.

Although there has been shown and described the preferred embodiment of the present invention, it will be readily apparent to those skilled in the art that modifications may be made thereto which do not exceed the scope of the appended claims. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting essentially of" or "consisting of", and as such the written description requirement for claiming one or more embodiments of the present invention using the phrase "consisting essentially of" or "consisting of" is met.

What is claimed is:

1. A photocatalyst suspension reactor (100) for solar fuel formation comprising:

a. a pool (110) filled with a first portion of an electrolyte solution;
  wherein the electrolyte solution comprises a solvent, a plurality of redox shuttle molecules, and a plurality of photocatalyst particles;

b. a plurality of tubes (120) disposed on a surface of the pool (110), each tube of the plurality of tubes (120) comprising an upper half (121) and a lower half (122);
  wherein the upper half (121) comprises a transparent material configured to be minimally permeable to hydrogen gas and oxygen gas;
  wherein the lower half (122) is configured to be filled with a second portion of the electrolyte solution and comprises an ion bridge material permeable to the plurality of redox shuttle molecules and minimally permeable to the plurality of photocatalyst particles;
  wherein the plurality of photocatalysts are configured to catalyze an oxygen evolution reaction in the first portion of the electrolyte solution, yielding oxygen gas and a plurality of charged particles comprising ions, protons, and electrons;
  wherein the redox shuttle molecules are configured to transmit the plurality of charged particles from the first portion of the electrolyte solution to the second portion of the electrolyte solution such that the plurality of photocatalyst particles in the second portion of the electrolyte solution catalyze a hydrogen evolution reaction, yielding hydrogen gas; and c. a gas handling subassembly (130) fluidly coupled to the plurality of tubes (120), configured to accept the hydrogen gas and convert the hydrogen gas into energy.

2. The reactor (100) of claim 1, wherein the plurality of photocatalysts comprise particles comprising $Fe_2O_3$, $TiO_2$, $SrTiO_3$, ZnO, $SnO_2$, $WO_3$, $BiVO_4$, TaON, $BaTaO_2N$, $(CuGa)_{0.8}Zn_{0.4}S_2$, $CuGaS_2$, $Cu_3Nb_{0.9}V_{0.1}S_4$, and $Ta_3N_5$.

3. The reactor (100) of claim 2, wherein each photocatalyst of the plurality of photocatalysts further comprise one or more cocatalysts deposited discontinuously on a surface of the photocatalyst.

4. The reactor (100) of claim 3, wherein the one or more cocatalysts comprise metals including Pt, Ru, Ni, etc., ion-permeable oxides, nitrides, sulfides, or a combination thereof.

5. The reactor (100) of claim 4 further comprising one or more coating materials deposited discontinuously on the surface of the photocatalyst, the one or more materials comprising ion-permeable oxides, nitrides, sulfides, any ion, electron, or mixed conducting materials, or a combination thereof.

6. The reactor (100) of claim 3, wherein the one or more cocatalysts are deposited with spatial control.

7. The reactor (100) of claim 1 further comprising a plurality of oxygen release components interdigitatably disposed between the plurality of tubes (120).

8. The reactor (100) of claim 7, wherein the plurality of oxygen release components comprise a plurality of perforated surfaces (140) such that oxygen gas transfers from the pool (110) through the plurality of perforated surfaces (140) to an external environment.

9. The reactor (100) of claim 1, wherein the upper half (121) of each tube of the plurality of tubes (120) comprises polypropylene, high-density polyethylene, or a combination thereof.

10. The reactor (100) of claim 1, wherein the lower half (122) of each tube of the plurality of tubes (120) comprises a transparent dialysis-type material or a filter membrane separator material.

11. The reactor (100) of claim 1, wherein the pool (110) comprises a rectangular shape.

12. The reactor (100) of claim 1, wherein the gas handling subassembly (130) is fluidly coupled to the plurality of tubes (120) by a steel hydrogen outlet manifold (150) disposed at an end of the plurality of tubes (120).

13. The reactor (100) of claim 1 further comprising one or more hydrogen gas pumps operatively coupled to the plurality of tubes (120) configured to pump the hydrogen gas from the plurality of tubes (120) to the gas handling subassembly (130).

14. A photocatalyst suspension reactor (100), comprising:

a. a pool (110) containing a first portion of an electrolyte solution, wherein the electrolyte solution comprises redox shuttle molecules and a photocatalyst; and b. at least one tubular vessel partially submerged in the electrolyte solution, the tube comprising a floating portion (121) and a submerged portion (122),
  wherein the floating portion (121) comprises a transparent material configured to allow light to pass through and be minimally permeable to gasses,
  wherein the submerged portion (122) contains a second portion of the electrolyte solution, and comprises an ion bridge material permeable to the redox shuttle molecules and minimally permeable to the photocatalyst.

15. The reactor (100) of claim 14, wherein the photocatalyst comprises $Fe_2O_3$, $TiO_2$, $SrTiO_3$, ZnO, $SnO_2$, $WO_3$, $BiVO_4$, TaON, $BaTaO_2N$, $(CuGa)_{0.8}Zn_{0.4}S_2$, $CuGaS_2$, $Cu_3Nb_{0.9}V_{0.1}S_4$, and $Ta_3N_5$.

16. The reactor (100) of claim 14, wherein the photocatalyst comprises nanoparticles.

17. The reactor (100) of claim 14, wherein the photocatalyst is configured to catalyze an oxygen evolution reaction in the first portion of the electrolyte solution, yielding oxygen gas and a second plurality of charged particles comprising ions, protons, and electrons, wherein the oxygen gas is vented out of the reactor (100), wherein the redox shuttle molecules are configured to transport the second plurality of charged particles from the first portion of the electrolyte solution to the second portion of the electrolyte solution such that the photocatalyst in the second portion of the electrolyte solution catalyzes a hydrogen evolution reaction, yielding hydrogen gas.

18. The reactor (100) of claim 14, wherein the floating portion (121) comprises polypropylene, high-density polyethylene, or a combination thereof.

19. The reactor (100) of claim 14, wherein the submerged portion (122) comprises a transparent dialysis-type material or a filter membrane separator material.

20. A photocatalyst suspension reactor (100) for solar fuel formation comprising:

a. a pool (110) filled with a first portion of an electrolyte solution, having a rectangular shape;
   wherein the electrolyte solution comprises a solvent, a plurality of redox shuttle molecules, and a plurality of photocatalyst particles;

b. a plurality of tubes (120) disposed on a surface of the pool (110), configured to partially float on a surface of the electrolyte solution, each tube of the plurality of tubes (120) comprising an upper half (121) and a lower half (122);
   wherein the upper half (121) comprises a transparent material configured to be minimally permeable to hydrogen gas and oxygen gas;
   wherein the lower half (122) is configured to be filled with a second portion of the electrolyte solution and comprises an ion bridge material permeable to the plurality of redox shuttle molecules and minimally permeable to the plurality of photocatalyst particles;
   wherein the plurality of photocatalysts are configured to catalyze an oxygen evolution reaction in the first portion of the electrolyte solution, yielding oxygen gas and a plurality of charged particles comprising ions, protons, and electrons;
   wherein the redox shuttle molecules are configured to transmit the plurality of charged particles from the first portion of the electrolyte solution to the second portion of the electrolyte solution such that the plurality of photocatalyst particles in the second portion of the electrolyte solution catalyze a hydrogen evolution reaction, yielding hydrogen gas;

c. a plurality of perforated surfaces (140) interdigitatably disposed between the plurality of tubes (120) configured to allow the oxygen gas to transfer from the pool (110) through the plurality of perforated surfaces (140) to an external environment;

d. a gas handling subassembly (130) fluidly coupled to the plurality of tubes (120) by a steel hydrogen outlet manifold (150) disposed at an end of the plurality of tubes (120), configured to accept the hydrogen gas and convert the hydrogen gas into energy; and e. one or more hydrogen gas pumps operatively coupled to the plurality of tubes (120) configured to pump the hydrogen gas from the plurality of tubes (120) to the gas handling subassembly (130).

* * * * *